United States Patent
Ayyagari et al.

(10) Patent No.: US 6,514,438 B1
(45) Date of Patent: Feb. 4, 2003

(54) PULSE EXTRACTION OF OCULAR MEDICAL DEVICES

(75) Inventors: Madhu Ayyagari, Fairport, NY (US); Mahendra P. Nandu, Rochester, NY (US); Erik M. Indra, Webster, NY (US); Alan J. Braun, Livonia, NY (US)

(73) Assignee: Bausch & Lomb Incorporated, Rochester, NY (US)

( * ) Notice: Subject to any disclaimer, the term of this patent is extended or adjusted under 35 U.S.C. 154(b) by 272 days.

(21) Appl. No.: 09/698,418

(22) Filed: Oct. 27, 2000

Related U.S. Application Data

(60) Provisional application No. 60/172,806, filed on Dec. 21, 1999.

(51) Int. Cl.$^7$ .............................................. B29D 11/00
(52) U.S. Cl. ........................ 264/2.6; 134/901; 528/480; 528/496
(58) Field of Search ............................ 264/1.1, 2.6, 85, 264/344, 336, 1.36, 1.38; 134/31, 42, 901; 528/480, 483, 491, 495, 496

(56) References Cited

U.S. PATENT DOCUMENTS

| | | | |
|---|---|---|---|
| 3,408,429 A | 10/1968 | Wichterle | 264/1 |
| 3,660,545 A | 5/1972 | Wichterle | 264/1 |
| 4,055,378 A | 10/1977 | Feneberg et al. | 351/160 |
| 4,122,942 A | 10/1978 | Wolfson | 206/5.1 |
| 4,143,949 A | 3/1979 | Chen | 351/160 |
| 4,153,641 A | 5/1979 | Deichert et al. | 260/827 |
| 4,197,266 A | 4/1980 | Clark et al. | 264/1 |
| 4,214,014 A | 7/1980 | Höfer et al. | 427/40 |
| 4,312,575 A | 1/1982 | Peyman et al. | 351/160 |
| 4,555,732 A | 11/1985 | Tuhro | 358/213 |
| 4,632,844 A | 12/1986 | Yanagihara et al. | 427/38 |
| 4,740,533 A | 4/1988 | Su et al. | 523/106 |
| 5,034,461 A | 7/1991 | Lai et al. | 525/100 |
| 5,070,215 A | 12/1991 | Bambury et al. | 556/418 |
| 5,271,875 A | 12/1993 | Appleton et al. | 264/2.3 |
| 5,514,220 A | 5/1996 | Wetmore et al. | 134/22.18 |
| 5,607,518 A | 3/1997 | Hoffman et al. | 134/31 |
| 5,610,252 A | 3/1997 | Bambury et al. | 526/279 |
| 6,071,439 A | 6/2000 | Bawa et al. | 264/1.1 |

FOREIGN PATENT DOCUMENTS

| | | | |
|---|---|---|---|
| WO | WO 95/04609 | 2/1995 | B05D/7/24 |
| WO | WO 95/20476 | 8/1995 | B29C/37/00 |
| WO | WO 96/26059 | 8/1996 | B29C/37/00 |
| WO | WO 98/07554 | 2/1998 | B29C/33/60 |

*Primary Examiner*—Mathieu D. Vargot
(74) *Attorney, Agent, or Firm*—John E. Thomas

(57) ABSTRACT

A method of extracting residual materials from a polymeric, ophthalmic biomedical device, such as a contact lens, by using a mixture comprised of a primary solvent, such as carbon dioxide, and a polar co-solvent, such as isopropanol. By exposing the device to the co-solvent, the device expands. By pulsing or varying the concentration of the polar co-solvent in the mixture, the lens dimensions vary accordingly. When the lens is extracted while retained in a mold, the changes in lens dimensions causes the lens to be released from the mold.

8 Claims, 3 Drawing Sheets

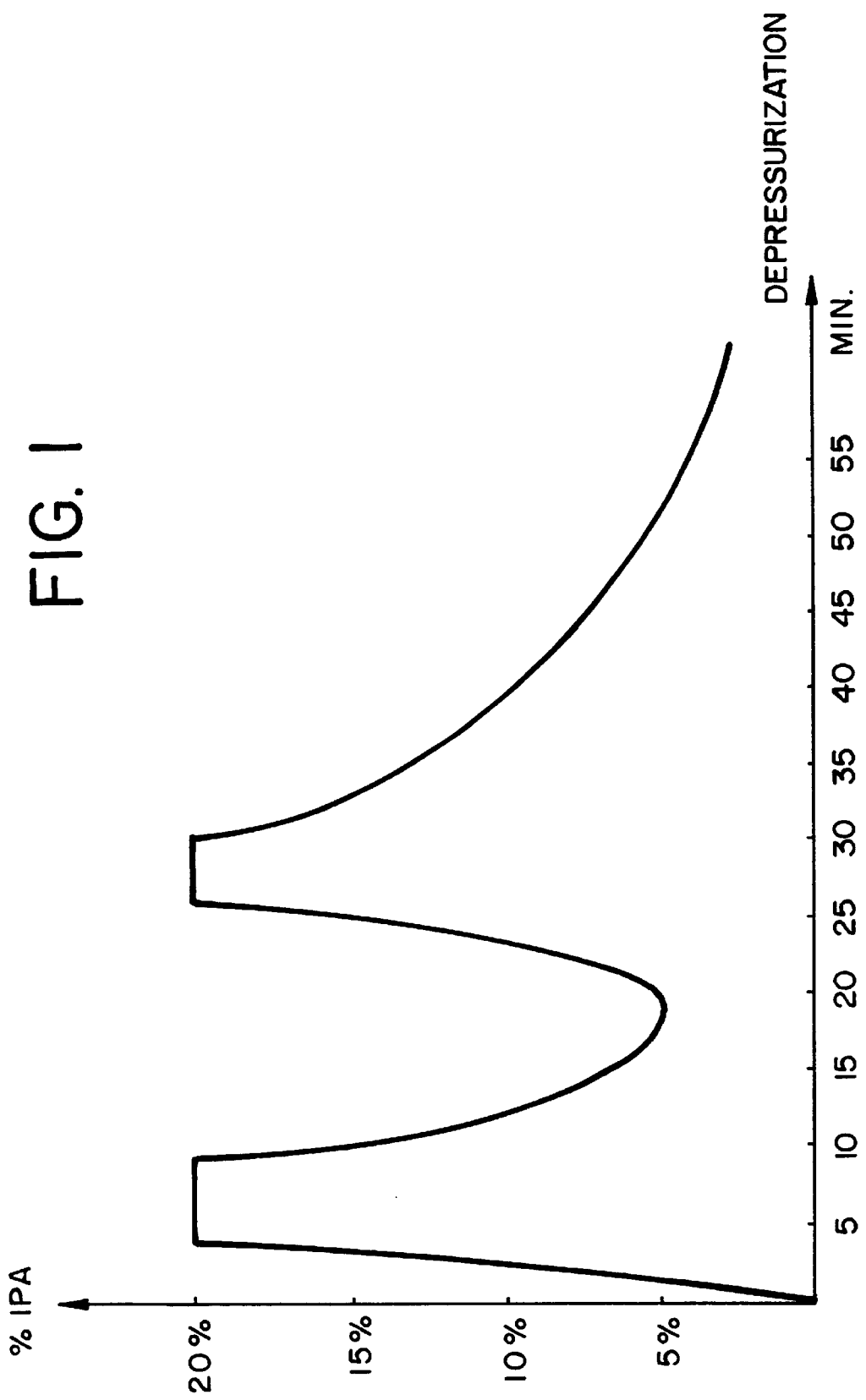

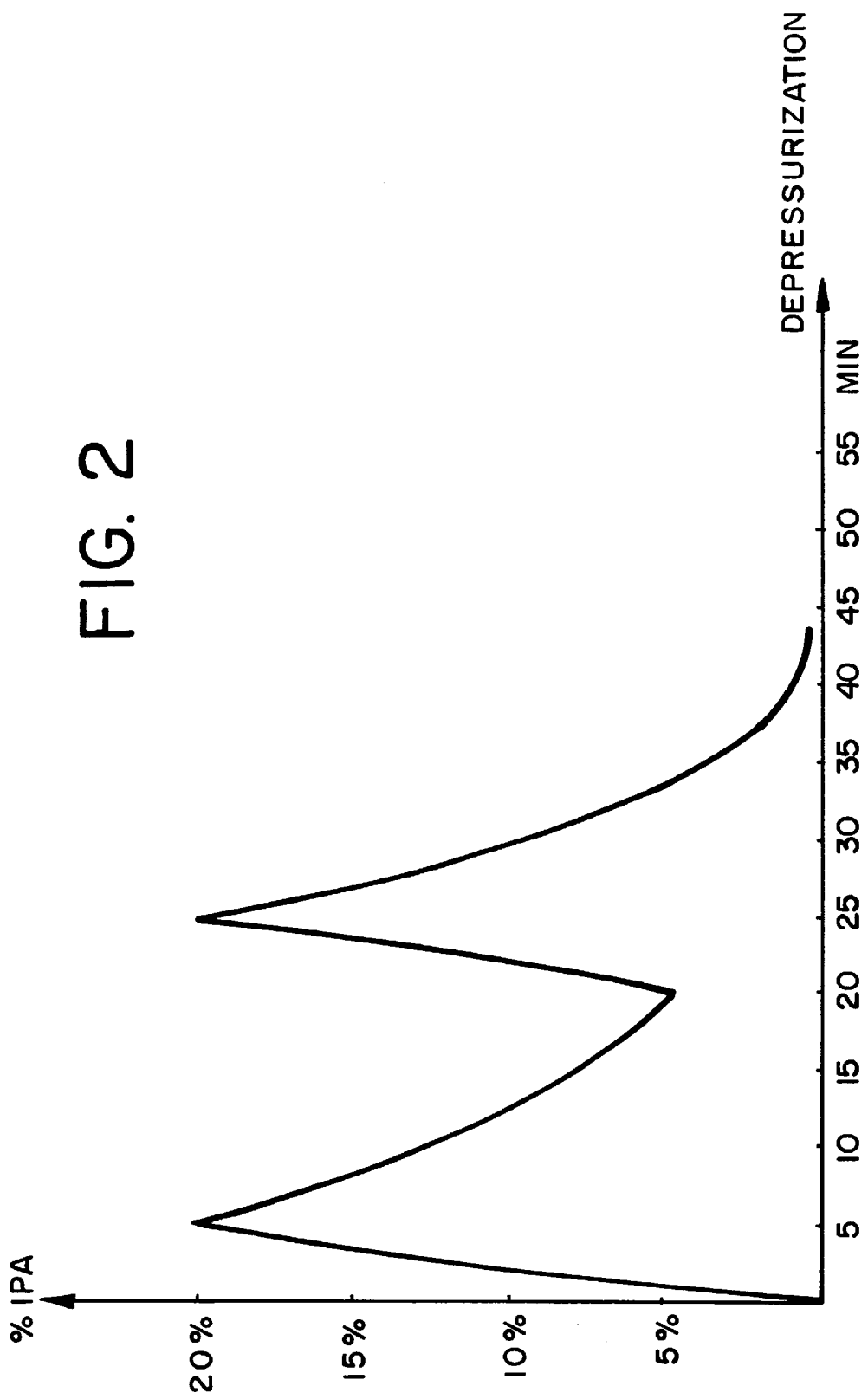

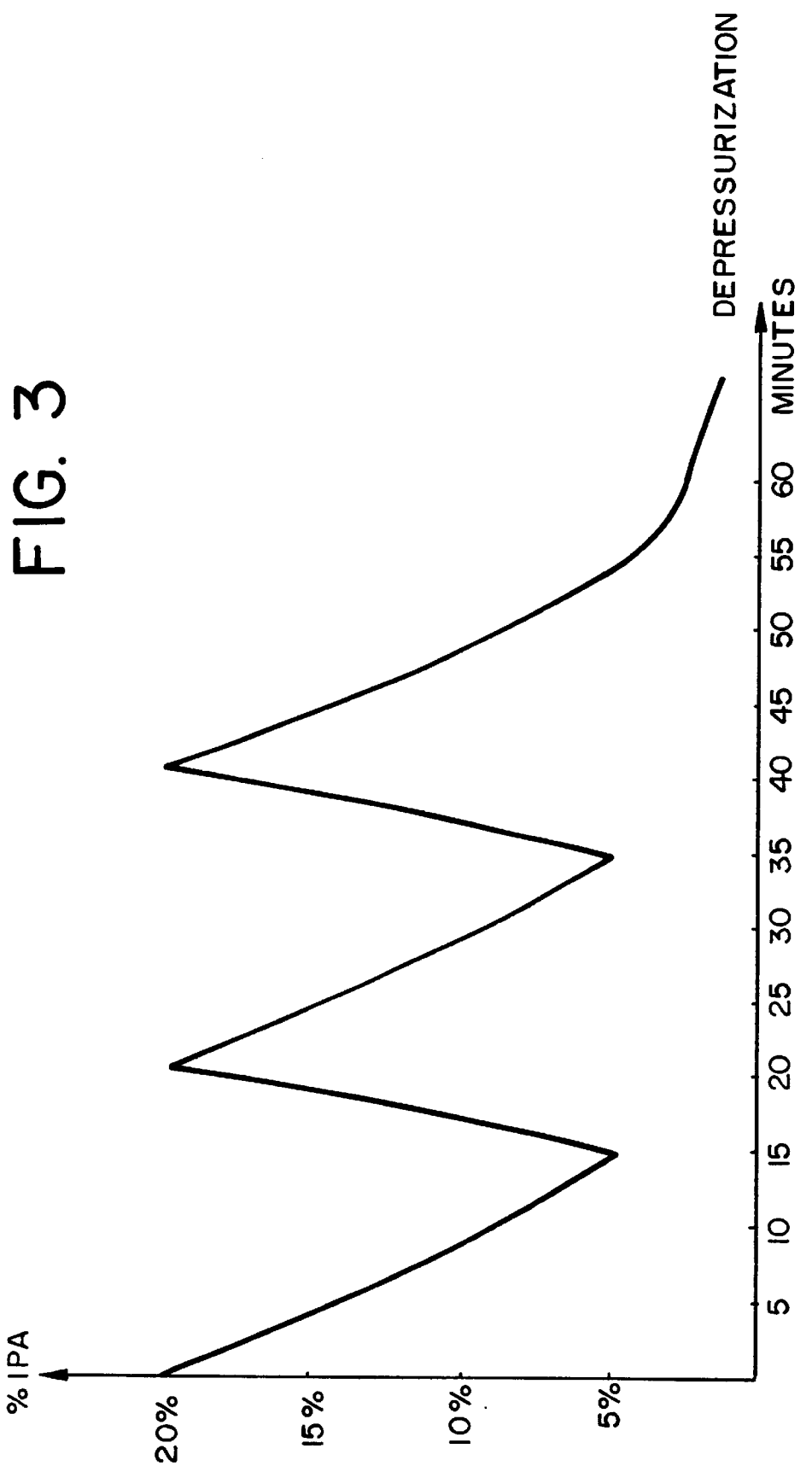

PULSE EXTRACTION OF OCULAR MEDICAL DEVICES

This application claims the benefit of U.S. Provisional Application No. 60/172,806 filed on Dec. 21, 1999.

BACKGROUND OF THE INVENTION

This invention relates to improved methods of manufacturing or processing polymeric biomedical devices, particularly ophthalmic biomedical devices, including contact lenses, intraocular lenses and ophthalmic implants. Specifically, this invention is related to extraction of unreacted monomers or oligomers from such devices.

Ophthalmic biomedical devices, such as intraocular lenses, contact lenses or ophthalmic implants, may be made from a variety of polymeric materials. For example, silicone hydrogel contact lenses are made from a monomer mixture containing hydrophilic and hydrophobic comonomers. The lenses are made by exposing this monomer mixture to heat (thermal polymerization), to UV radiation (UV polymerization) or other electromagnetic irradiation, or combinations thereof, thereby curing the monomer mixture to form a copolymeric material. The monomer mixture may be cast in a mold having a molding cavity corresponding to the desired contact lens shape. Alternately, a rod, cylindrical button, or other shaped article may be cast, and then cut into lenses. Diluents are sometimes used to reduce the incompatibility between the hydrophilic and hydrophobic monomers in the monomer mixture and to improve curing efficiency. The diluents are not polymerized and must eventually be removed from the cured polymer.

Generally, in the manufacture of such lenses, some of the monomers in the monomer mixture do not completely polymerize, resulting in unreacted monomers remaining in the lens. Further, the polymerization process may result in partially reacted oligomers remaining in the lens matrix. Additionally, additives from the mold may migrate into the lens material. Failure to perform an extraction step to remove such undesired materials from the lens may cause eye irritation or the lens may have reduced optical clarity and reduced biocompatibility. Additionally, there is concern with the possibility of ocular damage which may occur upon wearing an unextracted lens. The extraction of any lens contaminants generally should be as complete as possible.

A well-known method of extracting a contact lens involves placing the lens in an alcohol solution (e.g., isopropyl alcohol (IPA)) for several hours followed by a water extraction. The alcohol extracts hydrophobic or hydrophilic materials, including materials that have relatively low water solubility, while the water will extract water soluble residues. The water extraction will also remove any alcohol extraction solution that may have remained in the lens material. The extracting water may be heated to facilitate the extraction. While this extraction process is fairly efficient in removing materials from the lens, extraction by this process often generates volumes of contaminated solvent which may cause disposal and environmental problems.

As mentioned, a contact lens may be cast in a mold and then removed from the mold. After solvent reduction, which sometimes involves drying the lens in an oven, the lens is in a dry state. This allows the lens to be easily edged and surface treated, if necessary. The lens must be in a dry and unwarped state to undergo edging, surface treatment or handling. After this processing, the lens is extracted and/or hydrated with water or an aqueous solution. Inspection, packaging and sterilization of the lens may then be completed.

Since a lens must be in a dry state for various surface treatment processes, the lens is conventionally surface treated prior to extraction with a solvent such as isopropyl alcohol (IPA) and extraction/hydration with water. The IPA swells the lenses significantly, and this expansion may crack or otherwise deleteriously affect the lens surface coating. Since it is important to retain the surface coating, a different and more efficient process is desirable. Water also expands the lens but to a much lesser extent than IPA.

Other methods have been used to extract cured contact lenses. One method involves extracting with a solvent such as carbon dioxide, either in a supercritical state or at standard temperature and pressure. When the solvent is in a supercritical state, it has density and solvating strength approaching that of a liquid but the properties of a gas, such as high diffusivity and low viscosity. Carbon dioxide ($CO_2$) is often used as the solvent since it is environmentally friendly; it has a moderate critical temperature of 31° C. and a critical pressure of about 75 bar or 1100 psi.

By exposing a cured contact lens to supercritical or liquid carbon dioxide ($CO_2$), unreacted or incompletely polymerized material in the polymeric structure can be removed. WO 95/20476 (Bawa et al) discloses such a method. Supercritical carbon dioxide can be used to extract incompletely polymerized residual material from contact lens materials. By using a supercritical fluid such as carbon dioxide for extraction, as opposed to a liquid solvent, the lens is left in a dry and unwarped state. This has significant advantages in downstream processing. For example, a lens extracted in supercritical fluid can be edged and surface coated after extraction. WO 95/20476 (Bawa et. al.) also discloses adding a co-solvent such as IPA to the carbon dioxide. Other references also disclosing the use of carbon dioxide, with or without IPA, are WO 96/26059 (Hoffman et al) and WO 98/07554 (Terry et al).

SUMMARY OF THE INVENTION

The present invention provides a method of treating ophthalmic biomedical devices including contact lenses, intraocular lenses and ophthalmic implants. This treatment renders the device safe for prolonged contact with ocular tissue and, in the case of contact lenses, comfortable for wear.

According to certain embodiments, this invention provides a method of extracting unreacted or incompletely polymerized materials from the device by varying the concentration of a primary solvent, such as carbon dioxide, and a co-solvent, such as isopropanol. During the extraction process, the concentration of the co-solvent is pulsed. By "pulsing", it is meant that the concentration of the co-solvent begins at a lower first amount and then is increased to a second higher amount. The concentration is then returned to the lower first amount. This is considered to be a single pulse or one cycle. As the amount of the co-solvent is increased, the device expands in dimension, i.e., the diameter and center thickness increase. By reducing the amount of co-solvent, the device shrinks. Multiple pulses are preferred. During each pulse, the device goes through one cycle of expansion and shrinkage. After the extraction, the device is exposed to supercritical primary solvent which serves to dry the device. Following depressurization, the devices are recovered in a dry and unwarped state, and the devices can be further processed easily. As this extraction is done prior to surface treatment, there is no concern that coatings on the devices will be detrimentally affected by a subsequent extraction step; rather, surface treatment can be performed after recovering the dry device.

According to further embodiments, a device is extracted while retained in a portion of the mold. The device is released from the mold in which it was formed by the cycle(s) of expansion and shrinkage.

Specific embodiments of the invention include a method of extracting a polymeric, ophthalmic biomedical device comprising: (a) subjecting said device to a primary solvent; (b) subjecting said device to a mixture of a co-solvent and the primary solvent for a predetermined period of time; and (c) subjecting said device to the primary solvent for a predetermined time such that said device is in a dry state, wherein said ocular medical device goes through at least one cycle of expansion and shrinkage. Another specific embodiment includes a method of extracting a polymeric, ophthalmic biomedical device contained within a chamber, said method comprising: (a) subjecting said device to a supercritical fluid for a first predetermined time in said chamber; (b) introducing isopropyl alcohol into said chamber to obtain a first mixture including a first predetermined level of isopropyl alcohol and subjecting said device to said first mixture for a second predetermined period of time; (c) reducing the amount of isopropyl alcohol within said chamber to a second, lowered predetermined level and subjecting said device to the mixture for a third predetermined period of time; and (d) subjecting said device to supercritical fluid for a fourth predetermined time such that said lens is in a dry state, wherein said device goes through at least one cycle of expansion and shrinkage.

Another embodiment provides a method of extracting a contact lens retained in the mold in which it was cast, comprising: subjecting the lens to alternating concentrations of a supercritical fluid and a co-solvent, such that said contact lens goes through at least one cycle of expansion and shrinkage and whereby the contact lens is released from the mold. The invent also provides a process of making a contact lens comprising: (a) casting said lens in a two-part mold assembly; (b) removing a first mold portion such that said lens is retained in a second mold portion; (c) extracting said lens with mixture of a supercritical fluid and a solvent and releasing said lens from said second mold portion; (d) subjecting the lens to supercritical fluid, whereby a dry lens is obtained; (e) surface treating said dry lens such that at least one lens said surface is rendered hydrophilic; and (f) hydrating and packaging said lens.

The invention also provides a method of extracting an ocular medical device comprising, sequentially: (a) subjecting said device to a supercritical primary solvent, or a first mixture of a supercritical primary solvent and a co-solvent, in a chamber; (b) subjecting said device to a second mixture of the supercritical primary solvent and a co-solvent in the chamber, wherein the concentration of the extracting co-solvent is higher than the first mixture; (c) reducing the level of the extracting co-solvent in the chamber; (d) repeating steps (a) through (c); and (e) subjecting said device to the supercritical primary solvent to dry the device.

BRIEF DESCRIPTION OF THE DRAWINGS

FIG. 1 is a graph of a first embodiment showing pulsing or concentration changes of IPA in supercritical carbon dioxide over time;

FIG. 2 is a graph of an alternate embodiment of the invention; and

FIG. 3 is a graph of a third embodiment of the invention.

DETAILED DESCRIPTION OF THE INVENTION

As mentioned, in order for a polymeric, ophthalmic biomedical device to be safe and biocompatible, any unreacted monomers or partially reacted oligomers must be removed before the device is inserted in the eye and worn. It has now been discovered that by exposing the lens to a primary solvent, such as carbon dioxide, and a co-solvent such as isopropyl alcohol (IPA), unreacted or incompletely polymerized material can be removed from the polymeric structure. Additionally, this invention provides increased extraction efficiency; reduction in the amount of co-solvent, thus reducing the amount of co-solvent that needs to be disposed of; and reduction in the overall time required to effect removal of the residual materials from the device. This invention can be used at normal temperature and pressure or under supercritical conditions. The IPA concentration may be constant or varied within a predetermined range. The device undergoes a cycle of expansion and shrinkage which can be used as a means for releasing the device from the mold.

Hereafter, the description will refer mainly to a contact lens, but it is understood that various aspects of the invention are applicable to other polymeric, ophthalmic biomedical devices.

IPA is a common solvent used to extract contact lenses. Immersing a contact lens in IPA causes significant swelling to the dimensions of the lens. This increase in the lens dimensions facilitates mass transport which allows large molecules such as oligomers to diffuse out of the lens. Other examples of extracting co-solvents include other alcohols, glycols, ethers, ketones, alkanes and aromatic solvents.

Preferred contact lens materials include silicone hydrogels such as those disclosed by U.S. Pat. Nos. 5,070,215 and 5,610,252, the entire disclosures of which are hereby incorporated by reference. Silicone hydrogels frequently require surface treatment to increase wettability of the lens surface. For example, silicone lenses have been subjected to plasma surface treatment to improve their overall surface properties, e.g., surfaces have been rendered more hydrophilic, deposit resistant, scratch resistant, or otherwise modified. Examples of previously disclosed plasma treatments include subjecting contact lens surfaces to a plasma comprising: an inert gas or oxygen (see, for example, U.S. Pat. Nos. 4,055,378; 4,122,942; and 4,214,014); various hydrocarbon monomers (see, for example, U.S. Pat. No. 4,143,949); and combinations of oxidizing agents and hydrocarbons such as water and ethanol (see, for example, WO 95/04609 and U.S. Pat. No. 4,632,844). Additionally, U.S. Pat. No. 4,312,575 to Peyman et al. discloses a process for providing a barrier coating on a silicone or polyurethane lens by subjecting the lens to an electrical glow discharge (plasma) process conducted by first subjecting the lens to a hydrocarbon atmosphere followed by subjecting the lens to oxygen during flow discharge, thereby increasing the biocompatiblity of the lens surface.

Generally, the lens must be in a dry state to be plasma surface treated. Examples of a preferred surface treatment for silicone contact lenses are disclosed in U.S. Pat. application Ser. No. 09/295651 and 09/295675, both to Valint et al, the entire disclosures of which are incorporated herein by reference. If the lens is then extracted after surface treatment with a solvent such as IPA, the resultant swelling of the lens may cause the surface treatment to be damaged. For example, cracks in the coating may appear or certain areas may show decreased coating thickness. Additionally, since IPA is a relatively strong solvent, the surface coating may be damaged by the exposure to IPA.

The present invention recognizes that it is preferable to surface treat the lens after extraction. In order to accomplish this, the lens must be in a dry state following the extraction process. The surface treated, dry lens can then be hydrated and further packaged. Any surface treatment on the lens will remain largely intact, noting that hydration in water or an aqueous solution does not swell the lens to the extent as exposing the lens to IPA or like solvents.

Certain embodiments of the invention accomplish extraction by employing a mixture of liquid primary solvent, such as liquid carbon dioxide, with a co-solvent, such as IPA. For these embodiments, the extraction can be performed at normal room temperature and pressure. In addition to liquid carbon dioxide, the liquid primary solvent may be hexane or heptane. After extraction, the co-solvent is removed, leaving the lens in liquid primary solvent. Following the removal of the primary solvent, the lens is now in a dry state.

Other embodiments accomplish extraction using a mixture comprised of a supercritical fluid, such as carbon dioxide, and a liquid co-solvent, such as isopropanol. As previously mentioned, carbon dioxide has a critical temperature of 31° C. and critical pressure of 76 bar. When carbon dioxide is subjected to these two conditions, it is no longer considered to be in a gaseous or liquid state but rather in a supercritical state. In the supercritical state, carbon dioxide has ideal properties for extraction; it has the density approaching that of a liquid but the properties of a gas. Other examples of fluids that may be employed in its supercritical state include nitrous oxide, ethane, methane, propane, butane, ethylene, fluoroform, and chloroform.

Addition of a co-solvent to supercritical carbon dioxide can increase its extraction efficiency. IPA, however has a different critical temperature and a different critical pressure than carbon dioxide. IPA has a critical temperature of 235° C. and a critical pressure of 48 bar. Accordingly, addition of IPA to carbon dioxide will affect the temperature and pressure requirements for carbon dioxide to reach supercritical state. For instance, a mixture comprised of 5% IPA and 95% $CO_2$ by volume reaches a supercritical state at 47° C. and 85 bar. For a 20% IPA and 80% $CO_2$ mixture by volume, supercriticality is reached at 89° C. and 102 bar.

FIG. 1 is a graph showing the changes in concentration of IPA in supercritical carbon dioxide over time. This graph shows the pulsing, or variation of concentration of IPA with time used in the extraction method of this invention. To further describe this pulsing of IPA, the lens is initially exposed to only supercritical carbon dioxide while in the extraction vessel (not shown), represented by time zero. IPA is then introduced at a constant rate for a predetermined period of time. As the concentration of the IPA is increased, the concentration of the supercritical carbon dioxide is lowered. In the illustrated embodiment, the concentration of IPA is lowered to 5%, although the concentration may be lowered to near zero percent IPA. The illustrated maximum IPA concentration is 20%. IPA is introduced to the extraction vessel or chamber and the concentration is increased over a first predetermined period of time until the level of 20% IPA is reached. The level is maintained for a second predetermined time and gradually reduced over a third predetermined time period to a level of 5% IPA by flowing neat $CO_2$. This change in concentration of IPA hereby defines a single pulse. Multiple pulsing is represented by repeating cycles of 20% concentration IPA to gradually reducing the concentration to 5% IPA. At the end of the extraction, the IPA is further reduced to nearly zero and the vessel depressurized. While the preferred embodiment uses the range of 20% to 5% IPA, other ranges are possible depending on the material to be extracted. In the preferred embodiment, IPA is introduced to the system over a 15 minute time period (the first predetermined time period) until the level of IPA reaches 20%. The 20% IPA level is maintained for the second predetermined time of one hour and the period of time for reducing the IPA to 5% (the third predetermined time) is 15 minutes.

It is noted that whenever IPA is introduced to the chamber, fresh IPA (or recycled IPA from which extractables have been removed) is employed. This contributes to efficiency of the extraction process.

FIG. 2 represents a second embodiment of the invention. The lens is placed in the extraction vessel and initially exposed to supercritical carbon dioxide. IPA is introduced at a constant rate with the concentration of IPA rapidly increased over a predetermined period of time. After reaching 20% in the illustrated embodiment, the flow of IPA is reduced such that the IPA does not remain at 20% for any length of time. Over a predetermined period of time, the flow of IPA is reduced such that it reaches 5% in the illustrated embodiment. This represents a single pulse. While the first and second predetermined periods of time may vary according to specific application, in the illustrated embodiment, the first predetermined period of time is less than 10 minutes and the second predetermined period of time is 15 minutes. Preferably, there are at least two pulses in this embodiment. Again, it is preferred that fresh IPA (or recycled IPA from which extractables have been removed) is employed whenever IPA is introduced to the chamber.

FIG. 3 represents a third embodiment of the invention. The lens is placed in the extraction vessel and exposed immediately to carbon dioxide and 20% IPA. The IPA concentration is gradually decreased over a predetermined period of time to a concentration of 5% IPA. Once the level of IPA reaches 5%, the IPA concentration is increased to 20% over a second predetermined period of time. This represents one pulse. In the illustrated embodiment, the first predetermined period of time is 15 minutes and the second predetermined period of time is less than 10 minutes. There are preferably at least two pulses in this embodiment.

It is this "pulsing" of IPA, i.e., the steps of alternating the IPA concentration between one predetermined concentration and another predetermined concentration, that enhances the extraction of the contact lens and reduces the required amount of IPA as compared to known methods. Pulsing also facilitates release of the lens from the mold in which the lens was cured.

As the amount of IPA is increased in the extraction mixture, the lens increases in size. For example, at a concentration of 20% IPA, the lens "expands", as compared to the lens exposed to a concentration of 5% IPA. Then, upon the concentration of IPA being decreased from 20% to 5%, the lens "shrinks" or returns to the smaller size, closer to its original dry state. This cycle of expansion and shrinkage aids the extraction by expanding the surface area of the polymeric matrix. It is preferred that the lens undergoes at least one cycle of expansion and shrinkage during the extraction process.

Initially as the lens is exposed to neat supercritical carbon dioxide, the lens is in a dry state and at its most reduced size. It is also well known to those in the contact lens field that IPA causes most lens materials to expand or swell in size. By causing the lens material to expand, the interstitial spaces in the cured polymeric network are enlarged. Any materials such as oligomers or uncured monomers trapped within these interstices can now be more easily extracted.

According to one embodiment, the contact lens is placed in a chamber and extracted. The pressure with the extraction is maintained at 207 bar and the temperature is a constant 40° C. Under these temperature and pressure conditions, the IPA/$CO_2$ mixture would be near supercritical conditions at 5% IPA concentration. At a 20% IPA concentration, the IPA/$CO_2$ mixture would not be under supercritical conditions.

Any type of polymeric, ophthalmic biomedical device material may be extracted using this method. With respect to lenses, the lens material may be hydrophilic or hydrophobic or mixtures of both. The lens may be soft, hard, or rigid gas permeable. Examples of materials used to form ophthalmic lenses include rigid acrylic plastics including poly (methylmethacrylate); unsubstituted and fluoro-substituted polyethylenes, silicone elastomers, silicone hydrogels including bulky polysiloxanylalkyl (meth)acrylic monomers, silicone-containing vinyl carbonate or vinyl carbamate monomers, polyurethane-polysiloxane macromonomers including urethane elastomers and 2-hydroxyethyl methacrylate. Further examples of such monomers can be found in U.S. Pat. Nos. 4,153,641; 4,740,533; 5,034,461; and 5,070,215. It is these monomers that may not fully react and thereby need to be extracted out of the cured lens. In the preferred embodiment, the lenses are hydrogels and generally formed of a copolymer of at least one hydrophilic monomer, one hydrophobic monomer (e.g., a silicone-containing monomer) and, optionally, a separate crosslinking monomer. The preferred materials are polysiloxane hydrogels.

The crosslinking monomer may be material having multiple polymerizable functionalities, preferably vinyl functionalities. Representative cross-linking monomers include: divinylbenzene, allyl methacrylate, ethyleneglycol dimethacrylate, tetraethyleneglycol dimethacrylate, polyethyleneglycol dimethacrylate, and vinylcarbonate derivatives of the glycol dimethacrylates. In the case of silicone hydrogel contact lenses, the copolymeric material further includes at least one silicone-containing monomer.

Unreacted monomer and oligomers need to be extracted from the cured lens material. Additionally, diluents are also commonly used in contact lens manufacturing to aid in minimizing incompatibility between the components in the initial monomer mixture. Eventually, these diluents need to be removed from the cured lens. Examples of diluents commonly used include: monohydric alcohols, such as $C_6$–$C_{12}$ straight-chained or branched aliphatic monohydric alcohols; diols, such as ethylene glycol; polyols, such as glycerin; ethers such as diethylene glycol monoethyl ether; ketones, such as methyl ethyl ketones; esters, such as methyl heptanoate; and hydrocarbons, such as toluene.

The lenses may be made by any methods known to those skilled in the art. Spincasting methods are disclosed in U.S. Pat. Nos. 3,408,429 and 3,660,545. U.S. Pat. No. 4,555,732 discloses a process where monomeric mixture is cured by spincasting to form a shaped article having an anterior lens surface and the posterior surface is subsequently lathe cut to provide a contact lens. Static cast molding methods are disclosed in U.S. Pat. Nos. 3,408,429, 4,197,266 and 5,271,875. Other methods are known to those skilled in the art.

To undergo pulse extraction of this invention, the formed contact lens may or may not be removed from the mold in which it was cured. If the lens has been removed from the molds, trays such as those disclosed in the copending, commonly assigned application MESH TRAY ASSEMBLY FOR CONTACT LENS PROCESS, U.S. Serial No. 60/163208 by Stafford et al., the disclosure of which is incorporated herein by references, can be used to hold multiple lenses. Solid polypropylene or Teflon trays may also be used.

Additionally, contact lenses must be sufficiently hydrophilic at the lens surface to properly wet and maintain comfort. Wettability is the ability of a tear film to be formed on a contact lens surface by the eye's natural tears. Contact lenses containing silicone typically are hydrophobic and may require surface treatment. Other types of lenses may not be sufficiently wettable or hydrophilic and may also require surface modification. Lens surfaces may be plasma coated as a part of the manufacturing procedure. Examples of previously disclosed plasma surface treatments include subjecting contact lens surfaces to a plasma comprising an inert gas or oxygen (see, for example, U.S. Pat. Nos. 4,055,378; 4,122,942; and 4,214,014); various hydrocarbon monomers (see for example, U.S. Pat. No. 4,143,949); and combinations of oxidizing agents and hydrocarbons such as water and ethanol (see, for example, WO 95/04609 and U.S. Pat. No. 4,632,844). U.S. Pat. No. 4,312,575 to Peyman et al discloses a process for providing a barrier coating on a silicone or polyurethane lens by subjecting the lens to an electrical glow discharge (plasma) process conducted by first subjecting the lens to a hydrocarbon atmosphere followed by oxygen during flow discharge, thereby increasing the hydrophilicity of the lens surface.

Another benefit realized by the present invention is the reduction of disposable waste. In prior treatments where IPA was the single solvent used to extract contact lenses, large amounts of IPA were used. This resulted in a disposal problem of contaminated IPA. The present invention requires only a small percentage of that amount. This results in much smaller amounts of IPA waste that require disposal.

At the end of extraction, the amount of IPA is reduced to near zero, leaving the lens in supercritical carbon dioxide. Following depressurization, the lens is in a dry state, which allows it to be edged or machined. The lens can then undergo surface treatment. This represents a change from commonly used contact lens manufacturing procedures in which the lens is usually extracted after surface treatment.

In production methods using molds, the lens may be retained on the mold following casting, and it is necessary to release the lens from the mold without damaging the lens. By exposing the lens to repeated cycles of expansion and shrinkage that occurs with the pulsing of IPA in supercritical carbon dioxide of the present invention, the lens will automatically disengage itself from the mold. Hence, this pulse extraction method may also be used to release the lens from the mold.

EXAMPLE 1

Determination of Lens Expansion as a Function of the Concentration of Isopropyl Alcohol A series of experiments were designed to evaluate the efficacy of IPA extraction. Commercially available silicone hydrogel contact lenses (power −6.0D) were grouped into 15 batches with 25 lenses per batch. Each lens in every batch was weighed prior to extraction. Mixtures of IPA and an additional hydrophobic liquid primary solvent containing various amounts of IPA were prepared. The lenses were extracted in the solution for four hours. The extracted lenses were individually measured for diameter expansion and compared to dry unextracted lenses (Lens Batch #1). Additionally, lenses soaked in pure hydrophobic organic solvent were measured (Lens Batch #2).

TABLE 1

| Lens Batch # | % IPA | % Expansion |
|---|---|---|
| 1 | 0 (unextracted lenses) | 0 |
| 2 | 0 (heptane soak only) | 18.5 |
| 3 | 1 | 36.2 |
| 4 | 2 | 41.5 |
| 5 | 2.9 | 46.2 |
| 6 | 4.8 | 53.9 |
| 7 | 6.5 | 57.7 |
| 8 | 9.1 | 63.9 |
| 9 | 13.0 | 69.2 |
| 10 | 16.7 | 71.5 |
| 11 | 23.1 | 76.2 |
| 12 | 28.6 | 78.5 |
| 13 | 33.3 | 78.5 |
| 14 | 50 | 78.5 |
| 15 | 100 | 78.5 |

EXAMPLE 2

Lenses were treated as in Example 1 except that after extraction for four hours, the lenses were removed, allowed to dry and weighed. The percent weight as reported in Table 2 indicates the amount of extractables removed from the lens. The extracted lenses were individually weighed and compared to dry unextracted lenses (Lens Batch #16). Additionally, lenses soaked in pure hydrophobic primary solvent were measured (Lens Batch #17).

TABLE 2

| Lens Batch # | % IPA | % Weight Loss |
|---|---|---|
| 16 | 0 (unextracted lenses) | 0 |
| 17 | 0 (heptane soak only) | 9.1 |
| 18 | 2.5 | 11.2 |
| 19 | 5.0 | 12.3 |
| 20 | 10 | 14.4 |
| 21 | 20 | 14.3 |
| 22 | 40 | 14.2 |
| 23 | 60 | 13.6 |
| 24 | 80 | 13.3 |
| 25 | 100 | 13.6 |

As seen from Table 1, lenses extracted in hydrophobic organic solvent significantly increased in size. This swelling occurred even with relatively small amounts of IPA. In Table 1, maximum lens expansion occurred at approximately 28% IPA. As seen in Table 2, increasing the concentration of IPA above 10% did not result in increased extraction.

EXAMPLE 3

Cast molded balafilcon A lenses were dried to remove excess diluent and released from the mold. The lenses were edged and grouped into 9 batches. The lenses were placed in Teflon® trays and stacked on a holder. The holder was placed in the extraction vessel. The vessel was pressurized to 3000 psi, with carbon dioxide, at a temperature of 43° C. With the exit valve of the vessel slightly open, IPA was introduced at 2 ml/min for 15 minutes. This resulted in a mixture of 20% IPA and 80% carbon dioxide within the vessel.

Once the level of IPA reached 20%, both the IPA and carbon dioxide valves were shut off. The static level of 20% IPA was maintained for one hour. Carbon dioxide was pumped into the vessel at a flow rate of at least 10 g/min for 15 minutes. This lowered the level of IPA to approximately 5% IPA and 95% $CO_2$ by volume. This cycle represents a single pulse. The cycle was repeated so that the lenses were pulsed at least twice.

After the last pulse, the IPA flow was completely shut off so that only carbon dioxide flowed into the vessel for approximately 1.5 hours. The vessel was depressurized to atmospheric pressure and the lenses were recovered, the lenses being in a dry state. The dry lenses were analyzed for remaining residual materials, as reported in Table 3.

TABLE 3

| # of pulses (cycles) | Oligomers Peak Area | Unreacted Silicone Monomer (ppm) |
|---|---|---|
| 2 | 600 | 0.5 |
| 3 | 500 | 0.4 |
| 4 | 400 | 0.4 |
| 2 | 500 | 0.6 |
| 3 | 700 | ND |
| 4 | 500 | 0.6 |
| 2 | 500 | 0.7 |
| 2 | 600 | 1.0 |
| 2 | 400 | 0.2 |

Oligomer content was measured by size exclusion chromatography. The peak area represents the total amount of remaining oligomeric residuals. The other measurements were performed by gas chromatography. "ND" stands for not detected. All measurements were within acceptable levels.

EXAMPLE 4

Cast molded balafilcon A lenses were dried to remove any excess diluent, released from the mold, and grouped into three batches. The lenses were placed in Teflon® trays and stacked on a holder. The holder was placed in the extraction vessel. The vessel was pressurized to 3000 psi with carbon dioxide, at a temperature of 43° C. With the exit valve of the vessel slightly open, IPA was introduced at 4 g/min for 7.5 minutes. This resulted in a mixture of 20% IPA and 80% carbon dioxide within the vessel.

Once the level of IPA reached 20%, the IPA valve was shut off and carbon dioxide was pumped into the vessel at a flow rate of 15g/min for 15 minutes. The resultant mixture had a concentration of approximately 5% IPA and 95% $CO_2$. This cycle was repeated for the desired number of pulses.

After the pulse, the IPA flow was completely shut off so that only carbon dioxide flowed into the vessel for 30 minutes. The vessel was depressurized to atmospheric pressure and the lenses were recovered in a dry state. The dry lenses were analyzed for remaining residual materials, as reported in Table 4.

TABLE 4

| LOT | Oligomers Peak Area | Unreacted hydrophilic monomer (µg/mg) | Diluent (µg/mg) | Unreacted Silicone Monomer (ppm) |
|---|---|---|---|---|
| 1 | 700 | ND | ND | 3.9 |
| 2 | 800 | ND | ND | 2.9 |
| 3 | 1300 | ND | ND | 3.5 |

Lot 1 represents lenses that were exposed to four pulses of extraction as described above. Lot 2 represents lenses that were exposed to three pulses, and the Lot 3 lenses were exposed to two pulses.

Oligomer content was measured by size exclusion chromatography. The peak area represents the total amount of remaining oligomeric residuals. The other measurements were performed by gas chromatography. "ND" stands for not detected. All measurements were within acceptable levels.

The dried lenses obtained in Examples 3 and 4 are now suitable for conventional contact lens surface treatments.

We claim:

1. A method of extracting a polymeric, ophthalmic biomedical device comprising:

(a) subjecting said device to a primary solvent;
   (b) subjecting said device to a first mixture of a co-solvent and the primary solvent for a predetermined period of time and lowering the level of the co-solvent in the first mixture to form a second mixture and subjecting the device to the second mixture for a predetermined period of time, and
   (c) subjecting said device to the primary solvent for a predetermined time such that said device is in a dry state, wherein said ocular medical device goes through at least one cycle of expansion and shrinkage.

2. The method of claim 1, wherein said primary solvent is selected from the group consisting of liquid carbon dioxide, hexane and heptane.

3. The method of claim 1, wherein said primary solvent comprises liquid carbon dioxide.

4. The method of claim 1, wherein said co-solvent is selected from the group consisting of alcohols, glycols, ethers, ketones, alkanes and aromatic solvents.

5. The method of claim 1, wherein said co-solvent is isopropyl alcohol.

6. The process of claim 1, further comprising, surface treating the dry device obtained from step (c).

7. The method of claim 1, wherein said biomedical device is a contact lens.

8. The method of claim 1, wherein said biomedical device is an intraocular lens or ophthalmic implant.

* * * * *